May 10, 1960    H. H. MARVIN, JR    2,935,859
HERMETICALLY SEALED DYNAMOELECTRIC MACHINE
Filed Sept. 5, 1957

Inventor:
Henry H. Marvin, Jr.,
by Paul G. Frank
His Attorney.

United States Patent Office 2,935,859
Patented May 10, 1960

2,935,859

HERMETICALLY SEALED DYNAMOELECTRIC MACHINE

Henry H. Marvin, Jr., Schenectady, N.Y., assignor to General Electric Company, a corporation of New York Application September 5, 1957, Serial No. 682,159

15 Claims. (Cl. 62—498)

The present invention relates to dynamoelectric machines, and more particularly is concerned with certain improvements and modifications in the insulation of such machines.

In the construction of certain types of dynamoelectric machines, as for example, hermetically sealed refrigerator motors wherein both the refrigerant and the lubricant employed in the refrigerant system come in contact with the motor, the problem of finding a satisfactory motor insulation system has never been completely solved. The requirements of insulation for hermetically sealed refrigerator motors are extremely rigorous since the refrigerant and the lubricant both come into contact with the motor insulation and pass through the entire refrigeration cycle. This means that the insulation must resist deterioration caused by the refrigerant and the lubricant and in addition the insulation must not contain or produce an appreciable amount of water during its lifetime since a majority of present-day refrigerators employ capillary expansion of the refrigerant to provide the desired refrigeration. Any appreciable amount of water in the refrigerator cycle will cause freezing of the water in the capillary expansion tubes and will thereby render the refrigerator inoperative. The principal function of insulation in dynamoelectric machines is to insulate the windings of coils from each other (winding insulation), to insulate the coils from each other (phase insulation), and to insulate the coils from the coil slots in which they are located (slot insulation). In addition, it is common to tie together the ends of coils so as to provide a unitary coil structure (tie insulation).

The earliest hermetically sealed refrigerator motors employed an insulation system comprising cotton winding and tie insulation and paper slot insulation. Because cotton and paper produced a large amount of water under operating conditions, it was found that hermetically sealed refrigerator motors employing this insulation were constantly rusting and could not be employed in refrigeration systems employing capillary expansion tubes because of freeze-ups of these tubes by water.

One solution to the insulation problem in modern hermetically sealed refrigerant motors is the use of an insulation system comprising phenol-aldehyde-modified polyvinyl acetal resin coated conductors, such as described in Jackson et al. Patent 2,307,588 with paper slot insulation. This insulation system is operative in refrigeration units employing totally halogenated hydrocarbon refrigerants such as dichlorodifluoromethane. However, this insulation system is somewhat deficient in that more than an acceptable amount of water is released to the system during operation. To counteract this water in the system, an absorbent material, such as silica aerogel, is placed in the system and serves to absorb the water as it is formed. However, this insulation system is not satisfactory when a partially halogenated hydrocarbon, such as chlorodifluoromethane is employed as a refrigerant. Apparently, water released by the insulation system causes rust formation of the ferrous metal parts of the refrigeration apparatus and this rust serves as a catalyst for decomposition of the chlorodifluoromethane, liberating hydrochloric acid. This hydrochloric acid in turn attacks the insulation, releasing further water, and also serves as a catalyst for the rusting of the ferrous metal refrigerator parts. Thus, a cycle of deterioration is established which causes rapid failure of refrigeration systems of this character.

The importance of an insulation system suitable for operation with a number of different refrigerants and refrigerant mixtures including both totally halogenated hydrocarbons and partially halogenated hydrocarbons is obvious from a consideration of the capacity of refrigerant systems. In general, refrigerant systems employ positive, fixed displacement compressors and require a certain evaporator temperature. Therefore, with a given compressor and preselected evaporator and condenser temperatures, the capacity of the system is dependent upon the vapor density of the refrigerant in the system. Since vapor density is roughly proportional to the boiling point of the refrigerant, the capacity of the refrigerant system varies inversely with the boiling point of the particular refrigerant. Therefore, with a given compressor and given evaporator and condenser temperatures, it is desirable to be able to vary the capacity of the refrigerator unit by varying the refrigerant. In general, this is done by using either different types of pure refrigerants or by using mixtures of refrigerants. Since it is impracticable to have all of the desired refrigerants of the same generic composition, it is necessary to provide an insulation system which will be operative with all types of commercially available refrigerants including both the totally halogenated hydrocarbons and the partially halogenated hydrocarbons.

So far as applicant is aware, there is no prior art insulation system for hermetically sealed refrigerator motors which is satisfactory for use with both totally halogenated and partially halogenated refrigerants. The nylon insulation system described in Hall et al. Patent 2,169,097 is satisfactory in the presence of totally halogenated refrigerants, such as dichlorodifluoromethane. However, nylon insulation becomes seriously embrittled when in contact with partially halogenated hydrocarbons, such as chlorodifluoromethane and this embrittlement results in cracking of the winding insulation, slot insulation, and phase insulation, rendering the refrigerant motor inoperative because of short-circuiting.

An object of the present invention is to provide an insulation system for a hermetically sealed refrigerator motor which does not liberate an appreciable amount of water in use.

A further object of the present invention is to provide an insulation system for hermetically sealed refrigerant motors in which the various components of the insulation system do not react with each other or with the refrigerant and lubricant to provide harmful reaction products.

A still further object of the present invention is to provide an insulation system for hermetically sealed refrigerant motors which is satisfactory for use employing both totally halogenated hydrocarbons and partially halogenated hydrocarbons as refrigerants.

These and other objects of my invention are accomplished by providing a novel insulation system for hermetically sealed refrigerant motors. This system employs as winding insulation a cured polyester resin prepared by reacting certain proportions of terephthalic or isophthalic acid or derivatives thereof, ethylene glycol, and a polyhydric alcohol having more than two hydroxyl groups, such as glycerine. As slot and phase insulation I employ polyalkylene terephthalate film such as the polyethylene terephthalate film sold under the trade name of Mylar by the E. I. du Pont de Nemours Company. As tie insulation I employ a fibrous polyalkylene terephthalate such as the polyethylene terephthalate sold under the trade name Dacron by E. I. du Pont de Nemours Company.

The novel features of my invention are set forth in the appended claims. The invention itself, however, will be understood most readily from the following detailed description when considered in connection with the accompanying drawing which is representative of one embodiment of the invention, and in which:

Figure 1:
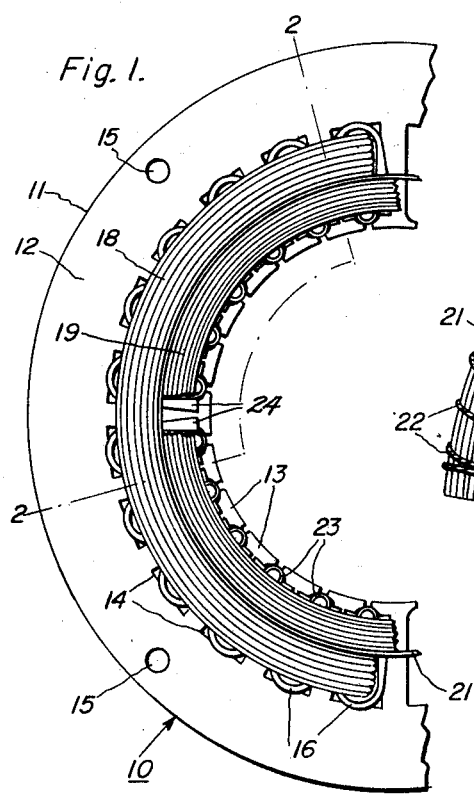
Fig. 1 is an end view of a portion of a member, specifically a stator, of a dynamoelectric machine embodying my invention prior to tying of the coil ends.

The cured polyester resin winding insulation employed in the practice of the present invention is characterized by extremely high mechanical strength, extremely good adhesion to electrical conductors, exceptionally high resistance to thermal degradation, and exceptionally high resistance to ordinary solvents, hydrocarbon materials, and materials commonly employed as refrigerants in refrigerant systems, such materials commonly being sulfur dioxide, totally halogenated hydrocarbons, such as dichlorodifluoromethane, fluorotrichloromethane, tetrafluorodichloroethane, etc.; and partially halogenated hydrocarbons, such as chloromethane and chlorodifluoromethane. This cured polyester resin and electrical conductors coated therewith are described and claimed in the copending application of Frank M. Precopio and Daniel W. Fox, Serial No. 474,624, filed December 10, 1954, and assigned to the same assignee as the present invention. This Precopio et al. application is hereby incorporated by reference into the present application. This cured polyester resin is obtained by heating a mixture of (1) from about 25 to 56 equivalent percent of a lower dialkyl ester of a member selected from the class consisting of terephthalic acid and isophthalic acid and mixtures of said members, (2) from about 15 to 46 equivalent percent of ethylene glycol, and (3) from about 13 to 44 equivalent percent of a saturated aliphatic polyhydric alcohol having at least 3 hydroxyl groups, the sum of the equivalent percents of (1), (2), and (3) being equal to 100 equivalent percent. The term "equivalent percent" used in defining this cured polyester resin refers to one hundred times the number of equivalents of any particular ingredient divided by the total number of equivalents of ingredients in the resin. An equivalent of any of the ingredients in the aforementioned cured polyester resin is equal to the number of moles of the particular ingredient times the number of hydroxyl or carboxyl groups in each molecule of the ingredient.

The polyester resins of the aforementioned Precopio et al. application are formed by heating the desired ingredients for about 3 to 4 hours to a final temperature of about 250 to 300° C. At the end of this time, the resulting polyester resin is dissolved in a suitable solvent, such as m-cresol, and an electrical conductor, such as a copper conductor, is dipped into this resin solution. The coated conductor is then baked at a temperature of about 400° C. to cure the polyester resin and remove all traces of the solvent. This results in a cured, crosslinked polyester resin which is insoluble in most solvents. The preferred class of resins of the aforesaid Precopio et al. application are resins formed from dimethyl terephthalate, ethylene glycol, and glycerine. Specifically, the preferred resin is prepared from about 45 equivalent percent of dimethyl terephthalate, 33 equivalent percent of ethylene glycol, and 22 equivalent percent of glycerine. Another very satisfactory cured polyester resin for use in the present invention is prepared from 46 equivalent percent of dimethyl terephthalate, 17 equivalent percent of ethylene glycol, and 37 equivalent percent of glycerine.

The slot and phase insulation employed in the practice of the present invention is a well known commercial material which is prepared generally by heating under vacuum a mixture of a lower alkyl terephthalate, such as dimethyl terephthalate, with an alpha,omega-alkanediol. Generally, the material is prepared by heating ethylene glycol and dimethyl terephthalate until the desired molecular weight is obtained. The high molecular weight material is then extruded and calendered to form films of the desired thickness. The thickness of the polyalkylene terephthalate insulation employed in the practice of the present invention is not critical and may vary within wide limits. Generally, satisfactory thicknesses range from about 2 to 50 mils.

The tie insulation or tying cords employed in the practice of the present invention must also be of a material which is inert in a refrigeration system and inert with respect to the other ingredients in this system. Accordingly, I have found that the most satisfactory material for tie insulation is woven polyalkylene terephthalate fiber cord, such as sold under the trade name of Dacron fiber. This material is formed in the same manner as the polyalkylene terephthalate film except that filaments are drawn from the molten polyalkylene terephthalate and these filaments are then woven into threads or cords.

As supplied commercially under the trade names of Mylar film and Dacron fiber, polyalkylene terephthalate materials, such as polyethylene terephthalate polymers, contain a minor amount of low molecular weight materials. The only effect of this low molecular weight fraction is that the material can be released into the refrigeration system. However, the only adverse effect of this release of material is a very slight decrease in efficiency of the refrigeration system. However, for practical application, polyethylene terephthalate polymers containing this low molecular weight fraction can be employed. If, for special applications, it is desired to remove this low molecular material, it may be extracted from the polyethylene terephthalate with solvents, such as xylene or chlorobenzene.

Figure 2:
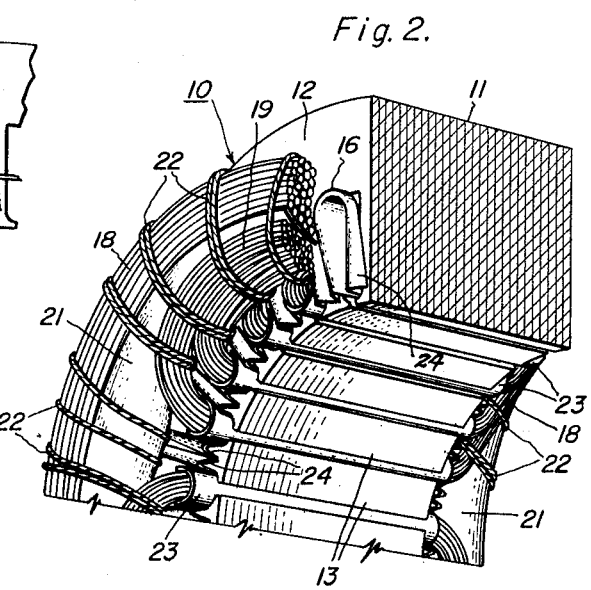
Fig. 2 is an enlarged, elevational, fragmentary perspective view of a portion of a stator taken generally on the line 2—2 of Fig. 1.
Figure 3:
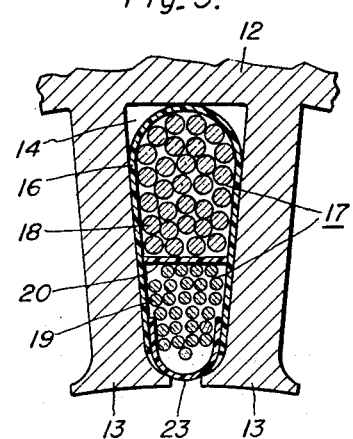
Fig. 3 is an enlarged, elevational, fragmentary view of a section of a stator slot.

In Figs. 1 to 3, a portion of a dynamoelectric machine is shown for purpose of illustrating the invention. This portion comprises a stationary element or stator 10 having a magnetic core 11 which is indicated in Fig. 2 as being made of laminations, but which may be in any other suitable form. The core 11 consists of a main yoke portion 12 having teeth 13 extending therefrom to form a plurality of coil retaining slots 14. Apertures 15 are provided for bolts which support the core. The slots 14 are provided with a liner 16 which is formed of the aforementioned polyethylene terephthalate film.

As best shown in Fig. 3 the insulated conductors 17 are wound in the lined slots 14. It is an essential feature of the present invention that the insulation on conductors 17 comprise a cured polyester resin of the type described in the aforementioned Precopio et al. application. In the embodiment of the invention shown in the drawing, the slots are shown as containing superposed layers of turns or sides of insulated motor running conductor windings 18 and over that a second layer of insulated motor starting conducting windings 19 with a separator 20 therebetween. Separator 20 is also formed of a polyethylene terephthalate film.

As best shown in Figs. 1 and 2, the motor running windings 18 and the motor starting windings 19 are insulated from each other by a strip of phase insulation 21. It is also a critical feature of this invention that phase insulation 21 be formed of a polyalkylene terephthalate film, such as a polyethylene terephthalate film. As shown in Fig. 2 windings 18 and 19 and phase insulation 21 are formed into a unitary assembly by means of cords 22 which are polyalkylene terephthalate cords used to tie the entire coil and phase insulation assembly together. As best shown in Figs. 2 and 3, the insulated conductor windings are retained in slots 14 with wedges 23. If desired, the wedges 23 and the slot liner 16 may extend as shown between the ends of the slots. In this way the possibility of damaging the insulated conductors during the winding operation is minimized. To increase the edge tear strength of the slot liner 16 they may be folded over at their edges as shown at 24. Wedges 23 are formed of the same material as slot liners 16.

Motors insulated in accordance with the present invention are economical to construct and are efficient in operation. They have been used, for example, in refrigerating systems such as shown by way of illustration in Fig. 4, employing as refrigerants dichlorodifluoromethane, chlorodifluoromethane, and a number of mixtures of these two refrigerants without any of the difficulties which are usually encountered in refrigeration systems employing hermetically sealed motors insulated with conventional insulating materials. In particular, a number of refrigeration systems were constructed of the type shown in Fig. 4 and each of these systems was investigated with dichlorodifluoromethane and chlorodifluoromethane as refrigerants. As with most refrigeration systems employing capillary expansion tubes, this refrigerating system is designed to operate with a condenser temperature of about 75–100° C. This condenser temperature is also the temperature of the hermetically sealed refrigerator motor since the condensed refrigerant is in contact with this motor. With such systems and with operation at a condenser temperature of 75–100° C., experience has shown that the system becomes inoperative because of capillary freeze-up when more than 0.18 cc. of water accumulates in the system. In order to evaluate refrigeration systems of this type, it is conventional to operate the system at a condenser temperature of about 140° C. in an accelerated life test. Experience has shown that if there is to be serious interaction between the insulation components, the refrigerant, and the lubricant, such interaction will occur within 180 days at 140° C. and will show up as water present in the system. However, because of the high operating temperature, this water will not actually cause capillary freeze-up. It is estimated that this accelerated life test is a direct indication of the life of the refrigeration system. If a refrigeration system satisfactorily operates for 180 days at 140° C., it is estimated to have a life of from 15 to 20 years when operating at normal condenser temperatures of 75–100° C.

In order to evaluate the insulation system of the present invention, accelerated life tests were given to a number of different refrigeration systems containing different insulation systems and refrigerants.

Figure 4:
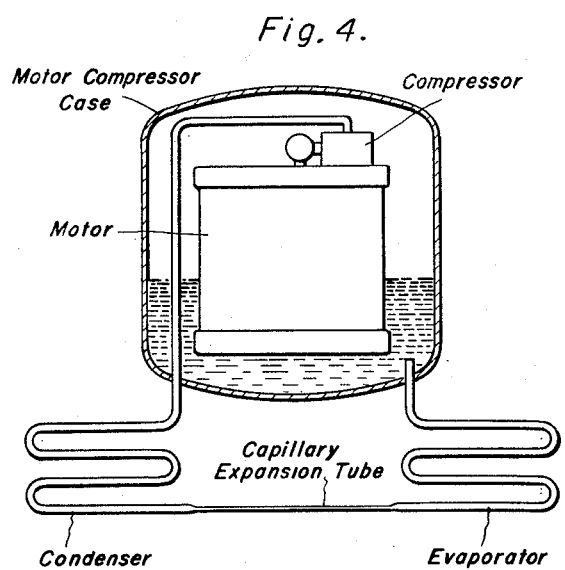
Fig. 4 is a view showing somewhat diagrammatically a refrigeration system to which my invention may be applied.

A refrigeration system corresponding to that shown in Fig. 4 was constructed employing cured polyester resin winding insulation prepared from 45 equivalent percent of dimethyl terephthalate, 33 equivalent percent of ethylene glycol, and 22 equivalent percent of glycerine. The slot insulation and phase insulation in this system consisted of polyethylene terephthalate film (Mylar film) and the coil ends were tied with polyethylene terephthalate (Dacron) cord. The lubricant in this refrigeration system was a low molecular weight aliphatic hydrocarbon oil which had been dewaxed. With dichlorodifluoromethane, it was found that after 180 days at 140° C. only 0.12 cc. of water had accumulated in the system. Under the same conditions, a hermetically sealed refrigerant motor employing phenol-formaldehyde modified polyvinyl acetal resin winding insulation with paper, slot and phase insulation and cotton tie insulation produced 1.48 cc. water with dichlorodifluoromethane as the refrigerant and produced 3.10 cc. of water with chlorodifluoromethane as the refrigerant. From these data, it is seen that the insulation system of the present invention is far superior to conventional hermetically sealed motor insulation systems using either totally halogenated or partially halogenated refrigerants. When another hermetically sealed refrigerator motor was constructed with a cured polyester resin which was the product of reaction of 46 equivalent percent of dimethyl terephthalate, 17 equivalent percent of ethylene glycol, and 37 equivalent percent of glycerine with polyethylene terephthalate, it was found that this second refrigerant system was equivalent in operation to the system using the first cured polyester resin winding insulation described above.

In order to determine whether the paper and cotton insulation in prior art systems was a cause of difficulty, a fourth hermetically sealed refrigerator motor was constructed employing phenol-formaldehyde modified polyvinyl acetal winding insulation with polyethylene terephthalate slot, phase, and tie insulation. In the accelerated life test described above, this system generated 0.65 cc. of water with dichlorodifluoromethane and 0.33 cc. of water with chlorodifluoromethane. It is seen that this system produced far more than the maximum allowable amount of water in the refrigeration system.

In describing the dynamoelectric machines of the present invention, emphasis has been placed on the use of such machines in refrigeration systems containing capillary expansion tubes. It should be understood, however, that these dynamoelectric machines are also useful in refrigeration systems employing conventional expansion valves. The extremely low amount of moisture generated by the insulation system of this invention tends to prolong the life of the valves by reducing the possibility of corrosion of the valves with water.

What I claim as new and desire to secure by Letters Patent of the United States is:

1. A refrigerator motor having a stationary member comprising a core provided with a plurality of slots, an insulating liner in each of said slots, and windings of an insulated electrical conductor within the lined slots, said insulating liner comprising a polyalkylene terephthalate film, and the insulation on said electrical conductor comprising a cured polyester resin consisting essentially of the product of reaction of (1) from about 25 to 56 equivalent percent of a lower dialkyl ester of a member selected from the class consisting of terephthalic acid and isophthalic acid and mixtures of said members, (2) from about 15 to 46 equivalent percent of ethylene glycol, and (3) from about 13 to 44 equivalent percent of a saturated aliphatic polyhydric alcohol having at least three hydroxyl groups, the sum of the equivalent percents of (1), (2), and (3) being equal to 100 equivalent percent.

2. A dynamoelectric machine having a member comprising a core provided with a plurality of slots, an insulating liner in each of said slots, and windings of an insulated electrical conductor within the lined slots, said insulating liner comprising a polyethylene terephthalate film, and the insulation on said electrical conductor comprising a cured polyester resin consisting essentially of the reaction product of (1) from about 25 to 56 equivalent percent of dimethyl terephthalate, (2) from about 15 to 46 equivalent percent of ethylene glycol, and (3) from about 13 to 44 equivalent percent of glycerine, the sum of the equivalent percents of (1), (2), and (3) being equal to 100 equivalent percent.

3. A refrigerator motor having a stationary member comprising a core provided with a plurality of slots, an insulating liner in each of said slots, and windings of an insulated electrical conductor within the lined slots, said insulating liner comprising a polyethylene terephthalate film, the insulation on said electrical conductor comprising the cured product of reaction of 45 equivalent percent of dimethyl terephthalate, 33 equivalent percent of ethylene glycol, and 22 equivalent percent of glycerine.

4. A refrigerator motor having a stationary member comprising a core provided with a plurality of slots, an insulating liner in each of said slots, and windings of an insulated electrical conductor within the lined slots, said insulating liner comprising a polyethylene terephthalate film, and the insulation on said electrical conductor comprising a cured polyester resin consisting of the reaction product of 46 equivalent percent of dimethyl terephthalate, 17 equivalent percent of ethylene glycol, and 37 equivalent percent of glycerine.

5. A refrigeration system comprising a compressor, a condenser, an evaporator, a halogenated hydrocarbon refrigerant, means interposed between said condenser and said evaporator for expansion of said refrigerant, and a hermetically sealed motor adapted to drive said compressor, said motor being positioned to be in contact with said refrigerant, said motor having a stationary member comprising a magnetic core provided with a plurality of slots, an insulating liner for each of said slots, and windings of an insulated electrical conductor within the lined slots, said insulating liner comprising a polyethylene terephthalate film, the insulation for said conductor comprising a cured polyester resin consisting essentially of the cured product of reaction of (1) from about 25 to 56 equivalent percent of a lower dialkyl ester of a member selected from the class consisting of terephthalic acid and isophthalic acid and mixtures of said members, (2) from about 15 to 46 equivalent percent of ethylene glycol, and (3) from about 13 to 44 equivalent percent of a saturated aliphatic polyhydric alcohol having at least three hydroxyl groups, the sum of the equivalent percents of (1), (2), and (3) being equal to 100 equivalent percent.

6. The refrigeration system of claim 5 in which the refrigerant is dichlorodifluoromethane.

7. The refrigeration system of claim 5 in which the refrigerant is chlorodifluoromethane.

8. The refrigeration system of claim 5 in which the refrigerant is a mixture of dichlorodifluoromethane and chlorodifluoromethane.

9. A refrigeration system comprising a compressor, a condenser, an evaporator, a halogenated hydrocarbon refrigerant, means interposed between said condenser and said evaporator for expansion of said refrigerant, and a hermetically sealed motor adapted to drive said compressor, said motor being positioned to be in contact with said refrigerant, said motor having a stationary member comprising a magnetic core provided with a plurality of slots, an insulating liner for each of said slots, and windings of an insulated electrical conductor within the lined slots, said insulating liner comprising a polyethylene terephthalate film, the insulation for said conductor comprising a cured polyester resin consisting essentially of the cured product of reaction of (1) from about 25 to 56 equivalent percent of dimethyl terephthalate, (2) from about 15 to 46 equivalent percent of ethylene glycol, and (3) from about 13 to 44 equivalent percent glycerine, the sum of the equivalent percents of (1), (2), and (3) being equal to 100 equivalent percent.

10. A refrigeration system comprising a compressor, a condenser, an evaporator, a halogenated hydrocarbon refrigerant, means interposed between said condenser and said evaporator for expansion of said refrigerant, and a hermetically sealed motor adapted to drive said compressor, said motor being positioned to be in contact with said refrigerant, said motor having a stationary member comprising a magnetic core provided with a plurality of slots, an insulating liner for each of said slots, and windings of an insulated electrical conductor within the lined slots, said insulating liner comprising a polyethylene terephthalate film, the insulation for said conductor comprising a cured polyester resin consisting essentially of the product of reaction of 45 equivalent percent of dimethyl terephthalate, 33 equivalent percent of ethylene glycol, and 22 equivalent percent of glycerine.

11. The refrigeration system of claim 10 in which the refrigerant is dichlorodifluoromethane.

12. The refrigeration system of claim 10 in which the refrigerant is chlorodifluoromethane.

13. The refrigeration system of claim 10 in which the refrigerant is a mixture of dichlorodifluoromethane and chlorodifluoromethane.

14. A refrigeration system comprising a compressor, a condenser, an evaporator, a halogenated hydrocarbon refrigerant, means interposed between said condenser and said evaporator for expansion of said refrigerant, and a hermetically sealed motor adapted to drive said compressor, said motor being positioned to be in contact with said refrigerant, said motor having a stationary member comprising a magnetic core provided with a plurality of slots, an insulating liner for each of said slots, and windings of an insulated electrical conductor within the lined slots, said insulating liner comprising a polyethylene terephthalate film, the insulation for said conductor comprising a cured polyester resin consisting essentially of the product of reaction of 46 equivalent percent of dimethyl terephthalate, 17 equivalent percent of ethylene glycol, and 37 equivalent percent of glycerine.

15. A refrigerator motor having a stationary core provided with a plurality of slots, an insulating liner in each of said slots, superposed layers of motor running coils and motor starting coils within the lined slots, said coils consisting of insulated electrical conductors, and phase insulation between said motor running coils and said motor starting coils, said insulating liner and said phase insulation comprising a polyethylene terephthalate film, the insulation on said conductors comprising a cured polyester resin consisting essentially of the product of reaction of (1) from about 25 to 56 equivalent percent of a lower dialkyl ester of a member selected from the class consisting of terephthalic and isophthalic acids and mixtures of said members, (2) from about 15 to 46 equivalent percent of ethylene glycol, and (3) from about 13 to 44 equivalent percent of a saturated aliphatic polyhydric alcohol having at least three hydroxyl groups, the sum of the equivalent percents of (1), (2), and (3) being equal to 100 equivalent percent.

References Cited in the file of this patent

UNITED STATES PATENTS

| | | |
|---|---|---|
| 2,169,097 | Hall et al. | Aug. 8, 1939 |
| 2,589,652 | Allison | Mar. 18, 1952 |
| 2,611,930 | Hill | Sept. 30, 1952 |
| 2,701,317 | Herman | Feb. 1, 1955 |
| 2,907,753 | MacLean | Oct. 6, 1959 |